(12) United States Patent  (10) Patent No.: US 6,843,838 B2
Zimmer et al.  (45) Date of Patent: Jan. 18, 2005

(54) INKJET INK, DYE SET, INK SET, AND METHOD OF USE THEREOF

(75) Inventors: Agnes Kam Zimmer, Lexington, KY (US); John M. Medley, Lexington, KY (US); Vladimir Kantorovich, Lexinton, KY (US); Wendell Lake, Lexington, KY (US); Sandra Helton McCain, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 93 days.

(21) Appl. No.: 10/335,581

(22) Filed: Dec. 31, 2002

(65) Prior Publication Data

US 2004/0123772 A1 Jul. 1, 2004

(51) Int. Cl.[7] .............................. C09D 11/02; C09B 1/00

(52) U.S. Cl. ................................. 106/31.27; 106/31.43; 106/31.48; 106/31.51; 8/641

(58) Field of Search ..................... 106/31.27, 31.43, 106/31.48, 31.51; 8/641; 347/100

(56) References Cited

U.S. PATENT DOCUMENTS

| | | | | |
|---|---|---|---|---|
| 6,521,032 | B1 | * | 2/2003 | Lehmann et al. ........ 106/31.35 |
| 6,596,067 | B2 | * | 7/2003 | Menzel et al. ........... 106/31.51 |
| 2002/0011179 | A1 | * | 1/2002 | Menzel et al. ........... 106/31.51 |
| 2003/0159616 | A1 | * | 8/2003 | Wang et al. ............. 106/31.43 |
| 2004/0074018 | A1 | * | 4/2004 | Wuzik et al. ................. 8/543 |

FOREIGN PATENT DOCUMENTS

| | | | |
|---|---|---|---|
| DE | 3129955 | * | 4/1982 |
| WO | WO 01/22127 A1 | * | 3/2001 |

* cited by examiner

*Primary Examiner*—Helene Klemanski
(74) *Attorney, Agent, or Firm*—John A. Brady

(57) ABSTRACT

The present invention provides inkjet inks, dye sets, and inkjet ink sets for use in inkjet printing methods. The inkjet inks and inkjet ink sets of the present invention can provide excellent photo-realistic print quality while achieving a high level of lightfastness. The inkjet ink comprises: a xanthene dye, and a metallized azo dye having the Formula (I). The inkjet ink set comprises: a magenta dye set comprising a xanthene dye, and a metallized azo dye having the Formula (I), at least one yellow ink comprising at least one yellow dye, and at least one cyan ink comprising at least one cyan dye. The present invention also provides a method of printing using the inkjet ink set of the present invention.

30 Claims, No Drawings

INKJET INK, DYE SET, INK SET, AND METHOD OF USE THEREOF

TECHNICAL FIELD

The present invention relates generally to ink employed in inkjet printing. More particularly, it is directed to a magenta dye set with enhanced archivability.

BACKGROUND OF THE INVENTION

Inkjet printing is accomplished by ejecting ink from a nozzle toward paper or another print medium. The ink is driven from the nozzle toward the medium in a variety of ways. For example, in electrostatic printing, the ink is driven by an electrostatic field. Another ink jet printing procedure, known as squeeze tube, employs a piezoelectric element in the ink nozzle. Electrically-caused distortions of the piezoelectric element pump the ink through the nozzle and toward the print medium. In still another inkjet printing procedure, known as thermal or bubble inkjet printing, the ink is driven from the nozzle toward the print medium by the formation of an expanding vapor phase bubble in the nozzle. These various printing methods are described in "Output Hard Copy Devices," edited by Durbeck and Sherr, Academic Press, 1988 (see particularly chapter 13, entitled "Ink Jet Printing").

In addition to the generation of text print documents, inkjet printing and inkjet inks have become increasingly important in the generation of photographs created through digital means. This transformation has exposed a significant problem with current inkjet technology: many inkjet inks cannot attain a necessary degree of permanence to be used to record photographs. Unlike previous applications, photographs require long-term archivability. Instead of lasting for a few weeks or months, photographs are expected to remain unchanged for years or even decades.

The composition of an inkjet ink is traditionally comprised of deionized water, a water soluble organic solvent, and a colorant. The colorant may be a soluble dye or insoluble pigment. Dye based inks have been preferred for their brilliant color reproduction. However, many dye based inks can exhibit poor lightfastness, thermal stability, and/or oxidation characteristics. As a result, it can be impractical to use these dye based inks to record photographs. Evidence of an ink with poor lightfastness, poor thermal stability, and/or facile oxidation can be seen in an ink that fades over time.

Therefore, a need exists for dye based inks that can provide the appropriate color characteristics, such as hue and high chroma, and at the same time have an appropriate level of lightfastness or archivability.

SUMMARY OF THE INVENTION

The present invention provides inkjet inks, dye sets, and inkjet ink sets for use in inkjet printing methods. The inkjet inks of the present invention can provide excellent photo-realistic print quality while achieving a high level of lightfastness. The inkjet ink comprises: a xanthene dye, and a metallized azo dye comprising a dye having the Formula (I):

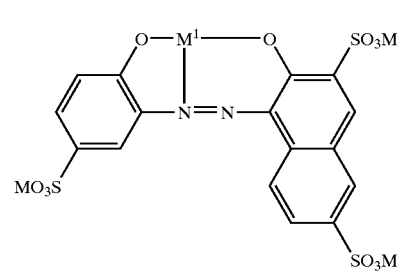

Formula (I)

wherein $M^1$ comprises Cu, Ni, Fe, or Cr; and M comprises —H, —Na, —Li, —K, or an ammonium ion.

The present invention also provides a dye set for formulating inkjet inks comprising: a magenta dye set comprising a xanthene dye, and a metallized azo dye comprising a dye having the Formula (I); at least one yellow dye; and at least one cyan dye.

The present invention also provides an inkjet ink set comprising: a magenta ink comprising a xanthene dye, and a metallized azo dye comprising a dye having the Formula (I); a yellow ink comprising at least one yellow dye; and a cyan ink comprising at least one cyan dye.

The present invention also provides a method for printing using an inkjet printer comprising the step of applying a set of inkjet inks onto a printing medium, said ink set comprising: a magenta ink comprising a xanthene dye, and a metallized azo dye comprising a dye having the Formula (I); a yellow ink comprising at least one yellow dye; and a cyan ink comprising at least one cyan dye.

DETAILED DESCRIPTION

The present invention is directed to a specific combination of dyes for use in inkjet printing. The dye set can enable a color inkjet printer to produce high quality color images having appropriate color characteristics, such as hue and high chroma, and images having an appropriate level of lightfastness on a range of media, particularly on plain paper and photo paper.

Specifically, the combination of dyes employed can provide excellent photo-realistic print quality while achieving an unprecedented level of archivability. Previous inks, using a less complex dye set, could attain the required color quality for photo-realistic printing, but failed to provide adequate archivability. The combination of dyes herein can overcome the archivability problem while maintaining excellent image quality.

Further, in order to ensure that the dye set will produce the most accurate photographic images, it is necessary to balance the color of the dyes in the final inks. Otherwise, it may be difficult to create accurate gray scales or truly vibrant colors. At the same time, it is necessary to ensure that the permanence of the final ink is not sacrificed to obtain this color. This need for permanence and color quality must also be balanced against the printability of the final ink from the cartridge. To this end, the levels of the various dyes in the final inks must be carefully chosen.

In one aspect, the present invention provides an inkjet ink comprising: a xanthene dye, and a metallized azo dye comprising a dye having the Formula (I)

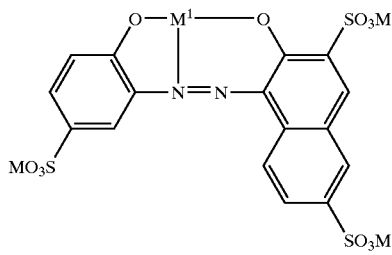

Formula (I)

wherein $M^1$ comprises Cu, Ni, Fe, or Cr; and M comprises —H, —Na, —Li, —K, or an ammonium ion. In an embodiment, $M^1$ comprises Cu.

In various embodiments of the inkjet ink, the weight ratio of xanthene dye to metallized azo dye ranges from about 1:10 to about 1:1. In a preferred embodiment, the weight ratio of xanthene dye to metallized azo dye is about 1:2.

In another embodiment, the xanthene dye comprises at least one of Acid Red 52, Acid Red 289, or mixtures thereof. In a preferred embodiment, the amount of Acid Red 289 is from about 0.0% to about 2% by weight, the amount of Acid Red 52 is from about 0.0% to about 1.5% by weight, and the amount of the metallized azo dye of Formula (I) is from about 2.0% to about 4.0% by weight. In another preferred embodiment, the amount of Acid Red 289 and the amount of Acid Red 52 is less than or equal to the amount of the metallized azo dye of Formula (I).

In another embodiment, the inkjet ink may further comprise a triazine dye comprising a dye having the Formula (II):

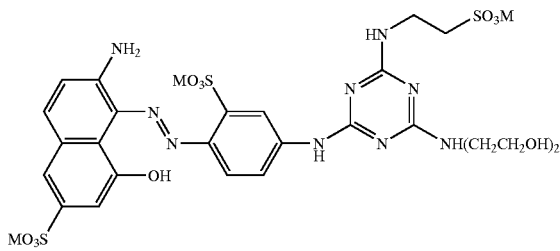

Formula (II)

wherein M comprises —H, —Na, —Li, —K, or an ammonium ion. In various embodiments, the weight of ratio of xanthene dye to metallized azo dye to triazine dye ranges from about 1:4:2 to about 1:2:4. In a preferred embodiment, the amount of xanthene dye is from about 0.5% to about 1.5% by weight, the amount of the metallized azo dye of Formula (I) is from about 1.0% to about 3.0% by weight, and the amount of triazine dye of Formula (II) is from about 1.0% to about 3.0% by weight. In another preferred embodiment, the amount of xanthene dye is less than or equal to the amount of the metallized azo dye of Formula (I) and the amount of triazine dye.

In another aspect, the present invention provides a dye set for formulating inkjet inks. The dye set comprises: a magenta dye set comprising a xanthene dye, and a metallized azo dye comprising a dye having the Formula (I):

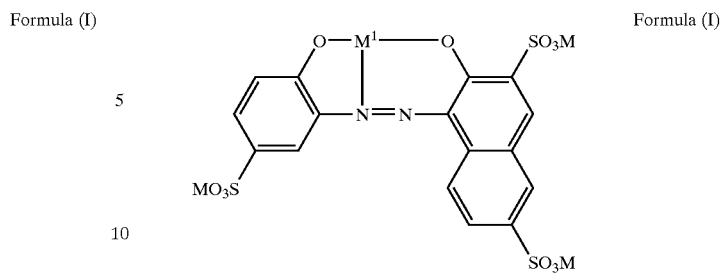

Formula (I)

wherein $M^1$ comprises Cu, Ni, Fe, or Cr; and M comprises —H, —Na, —Li, —K, or an ammonium ion; at least one yellow dye; and at least one cyan dye. In an embodiment, $M^1$ comprises Cu.

In another embodiment of the dye set, the weight ratio of xanthene dye to metallized azo dye ranges from about 1:10 to about 1:1. In a preferred embodiment, the weight ratio of xanthene dye to metallized azo dye is about 1:2.

In another embodiment of the dye set, the xanthene dye comprises at least one of Acid Red 52, Acid Red 289, or mixtures thereof. In a preferred embodiment, the amount of Acid Red 289 and the amount of Acid Red 52 is less than or equal to the amount of the metallized azo dye of Formula (I).

In another embodiment, the dye set may further comprise a triazine dye comprising a dye having the Formula (II):

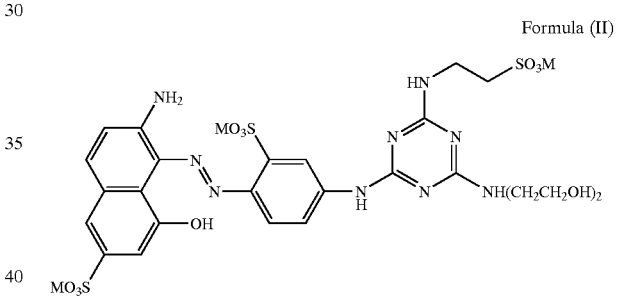

Formula (II)

wherein M comprises —H, —Na, —Li, —K, or an ammonium ion. In various embodiments, the weight ratio of xanthene dye to metallized azo dye to triazine dye ranges from about 1:4:2 to about 1:2:4. In a preferred embodiment, the amount of xanthene dye is less than or equal to the amount of the metallized azo dye of Formula (I) and the amount of triazine dye.

In another embodiment of the dye set, the at least one yellow dye comprises Acid Yellow 17, Acid Yellow 23, Direct Yellow 132, a dye having the Formula (III) and tautomers thereof

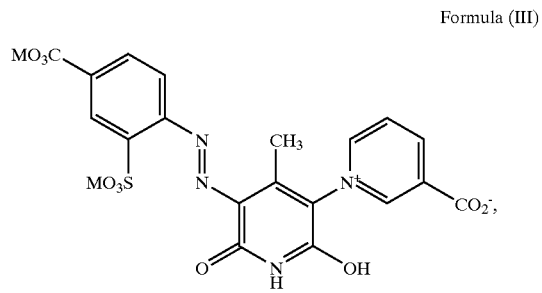

Formula (III)

a dye having the Formula (IV)

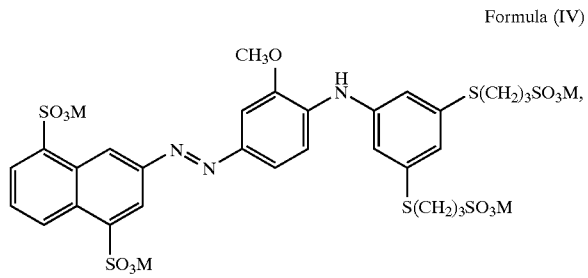

or a dye having the Formula (V)

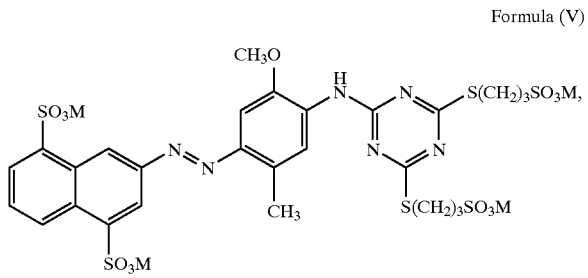

wherein M comprises —H, —Na, —Li, —K, or an ammonium ion.

In another embodiment of the dye set, the at least one yellow dye comprises Acid Yellow 17 or Acid Yellow 23 in combination with Direct Yellow 132, a dye having the Formula (III) or tautomers thereof

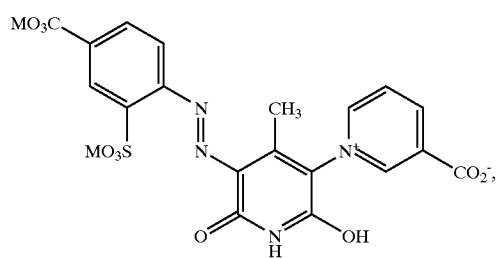

a dye having the Formula (IV)

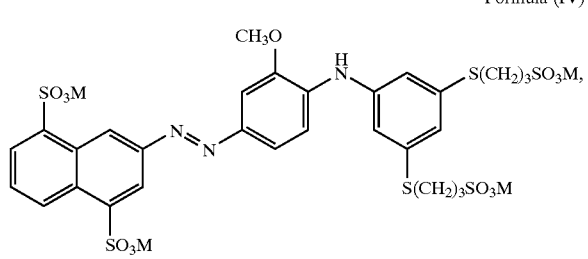

or a dye having the Formula (V)

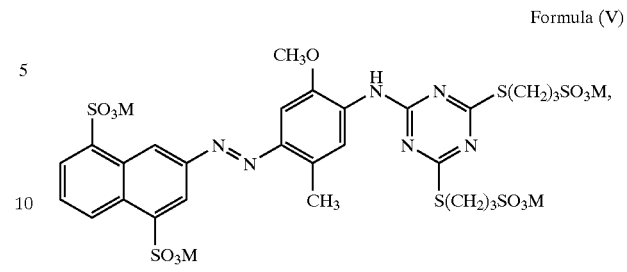

wherein M comprises —H, —Na, —Li, —K, or an ammonium ion.

In another embodiment of the dye set, the at least one cyan dye comprises Direct Blue 199, Acid Blue 9, or mixtures thereof.

In another aspect, the present invention provides an inkjet ink set comprising: a magenta ink comprising a xanthene dye, and a metallized azo dye comprising a dye having the Formula (I):

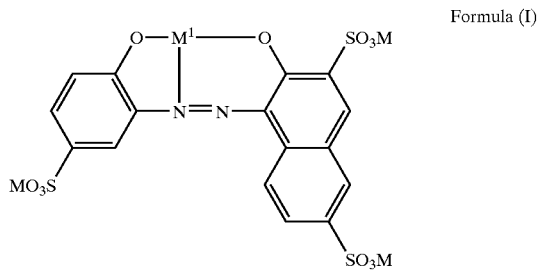

wherein $M^1$ comprises Cu, Ni, Fe, or Cr; and M comprises —H, —Na, —Li, —K, or an ammonium ion; a yellow ink comprising at least one yellow dye; and a cyan ink comprising at least one cyan dye. In an embodiment, $M^1$ comprises Cu.

In another embodiment of the ink set, the weight ratio of xanthene dye to metallized azo dye ranges from about 1:10 to about 1:1. In a preferred embodiment, the weight ratio of xanthene dye to metallized azo dye is about 1:2.

In another embodiment of the ink set, the xanthene dye comprises at least one of Acid Red 52, Acid Red 289, or mixtures thereof. In a preferred embodiment, amount of Acid Red 289 is from about 0.0% to about 2% by weight, the amount of Acid Red 52 is from about 0.0% to about 1.5% by weight, and the amount of the metallized azo dye of Formula (I) is from about 2.0% to about 4.0% by weight. In another preferred embodiment, the amount of Acid Red 289 and the amount of Acid Red 52 is less than or equal to the amount of the metallized azo dye of Formula (I).

In another embodiment, the magenta ink of the ink set may further comprise a triazine dye comprising a dye having the Formula (II):

Formula (II)

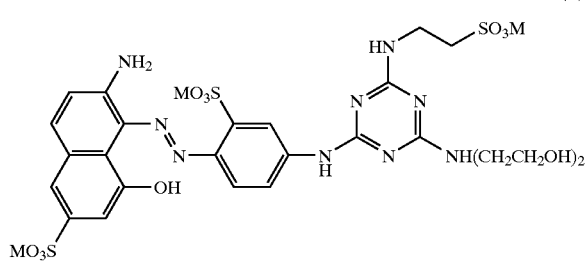

wherein M comprises —H, —Na, —Li, —K, or an ammonium ion. In various embodiments, the weight ratio of xanthene dye to metallized azo dye to triazine dye ranges from about 1:4:2 to about 1:2:4. In a preferred embodiment, the amount of xanthene dye is from about 0.5% to about 1.5% by weight, the amount of the metallized azo dye of Formula (I) is from about 1.0% to about 3.0% by weight, and the amount of triazine dye of Formula (II) is from about 1.0% to about 3.0% by weight. In another preferred embodiment, the amount of xanthene dye is less than or equal to the amount of the metallized azo dye of Formula (I) and the amount of triazine dye.

In another embodiment of the ink set, the at least one yellow dye comprises Acid Yellow 17, Acid Yellow 23, Direct Yellow 132, a dye having the Formula (III) and tautomers thereof:

Formula (III)

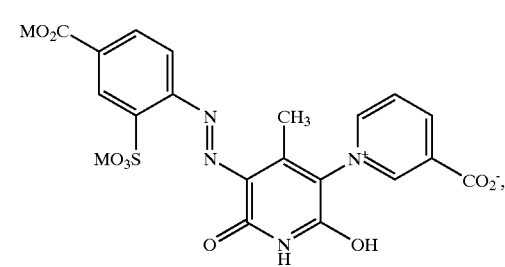

a dye having the Formula (IV):

Formula (IV)

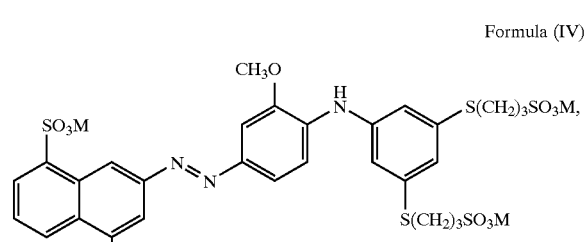

or a dye having the Formula (V):

Formula (V)

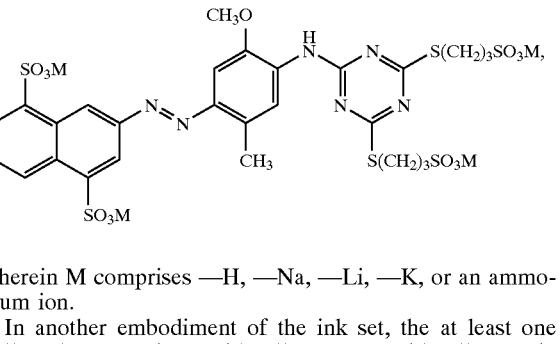

wherein M comprises —H, —Na, —Li, —K, or an ammonium ion.

In another embodiment of the ink set, the at least one yellow dye comprises Acid Yellow 17 or Acid Yellow 23 in combination with Direct Yellow 132, a yellow dye having the Formula (III) or tautomers thereof:

Formula (III)

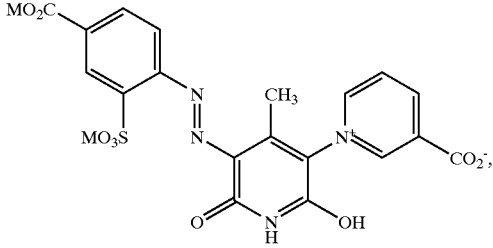

a dye having the Formula (IV):

Formula (IV)

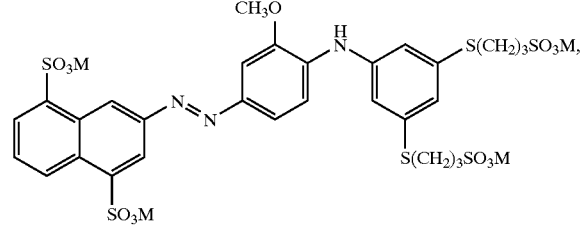

or
a dye having the Formula (V):

Formula (V)

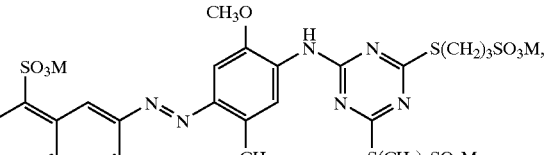

wherein M comprises —H, —Na, —Li, —K, or an ammonium ion.

In another embodiment of the ink set, the at least one cyan dye comprises Direct Blue 199, Acid Blue 9, or mixtures thereof.

In another aspect, the present invention also provides a method for printing using an ink-jet printer, comprising printing from a set of inkjet inks onto a printing medium, said ink set comprising the ink set described above. Thus, the present invention provides a method of printing comprising printing from a set of inkjet inks onto a printing medium, said ink set comprising a magenta ink comprising a xanthene dye, and a metallized azo dye comprising a dye having the Formula (I):

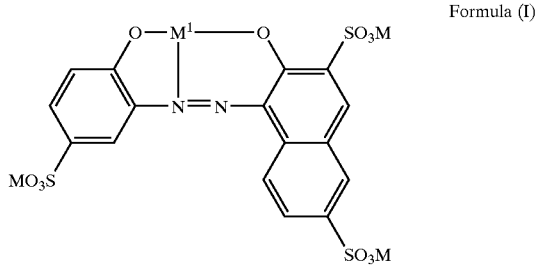

Formula (I)

wherein $M^1$ comprises Cu, Ni, Fe, or Cr; and M comprises —H, —Na, —Li, —K, or an ammonium ion; a yellow ink comprising at least one yellow dye; and a cyan ink comprising at least one cyan dye. In an embodiment, $M^1$ comprises Cu.

In another embodiment of the printing method, the weight ratio of xanthene dye to metallized azo dye ranges from about 1:10 to about 1:1. In a preferred embodiment, the weight ratio of xanthene dye to metallized azo dye is about 1:2.

In another embodiment of the printing method, the xanthene dye comprises at least one of Acid Red 52, Acid Red 289, or mixtures thereof. In a preferred embodiment, amount of Acid Red 289 is from about 0.0% to about 2% by weight, the amount of Acid Red 52 is from about 0.0% to about 1.5% by weight, and the amount of the metallized azo dye of Formula (I) is from about 2.0% to about 4.0% by weight. In another preferred embodiment, the amount of Acid Red 289 and the amount of Acid Red 52 is less than or equal to the amount of the metallized azo dye of Formula (I).

In another embodiment of the printing method, the magenta ink of the ink set may further comprise a triazine dye comprising a dye having the Formula (II):

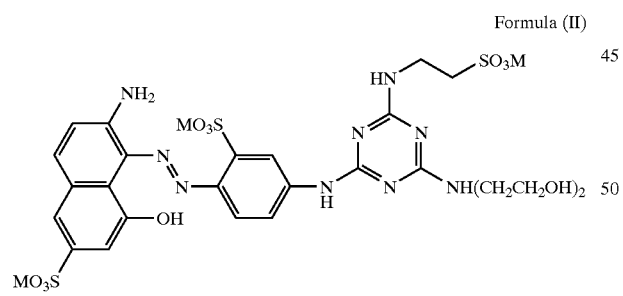

Formula (II)

wherein M comprises —H, —Na, —Li, —K, or an ammonium ion. In various embodiments, the weight of ratio of xanthene dye to metallized azo dye to triazine dye ranges from about 1:4:2 to about 1:2:4. In a preferred embodiment, the amount of xanthene dye is from about 0.5% to about 1.5% by weight, the amount of the metallized azo dye of Formula (I) is from about 1.0% to about 3.0% by weight, and the amount of triazine dye of Formula (II) is from about 1.0% to about 3.0% by weight. In another preferred embodiment, the amount of xanthene dye is less than or equal to the amount of the metallized azo dye of Formula (I) and the amount of triazine dye.

In another embodiment of the printing method, the at least one yellow dye comprises Acid Yellow 17, Acid Yellow 23, Direct Yellow 132, a dye having the Formula (III) and tautomers thereof:

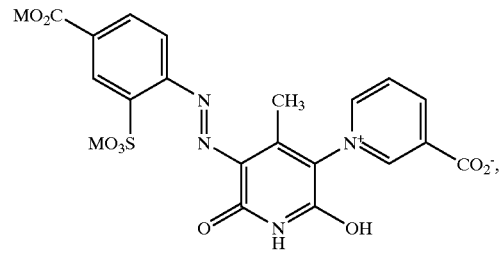

Formula (III)

a dye having the Formula (IV):

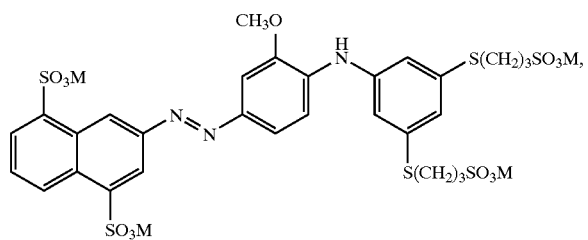

Formula (IV)

or a dye having the Formula (V):

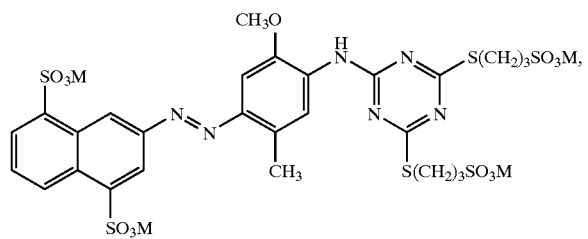

Formula (V)

wherein M comprises —H, —Na, —Li, —K, or an ammonium ion.

In another embodiment of the printing method, the at least one yellow dye comprises Acid Yellow 17 or Acid Yellow 23 in combination with Direct Yellow 132, a yellow dye having the Formula (III) or tautomers thereof:

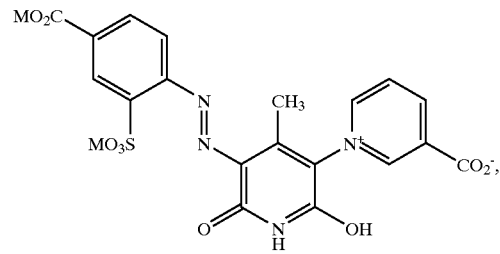

Formula (III)

a dye having the Formula (IV):

Formula (IV)

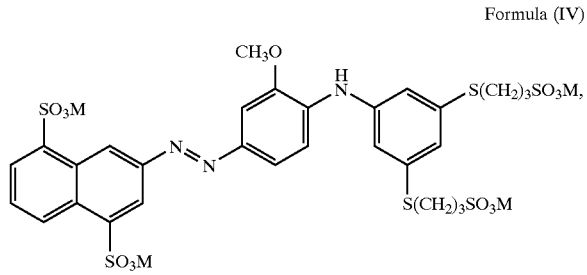

or
or a dye having the Formula (V):

Formula (V)

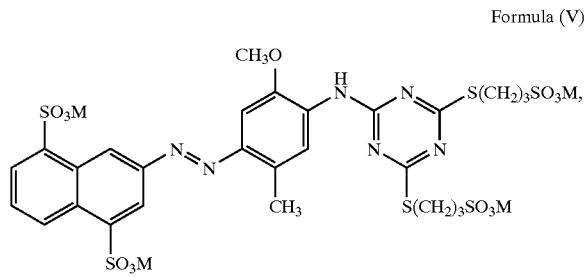

wherein M comprises —H, —Na, —Li, —K, or an ammonium ion.

In another embodiment of the printing method, the at least one cyan dye comprises Direct Blue 199, Acid Blue 9, or mixtures thereof.

The inks of the present invention may comprise from about 0.05% to about 20% dye by weight. In preferred embodiments, the inks may comprise from about 0.1% to about 8% dye by weight. In more preferred embodiments, the inks may comprise from about 1% to about 5% dye by weight.

A xanthene dye refers to any dye comprising a dibenzopyran central structure. Dyes comprising a dibenzopyran structure include fluoroscein, eosin, and rhodamine dyes. Examples of xanthene dyes comprising a rhodamine dye include, but are not limited to, C.I. Basic Red 1, C.I. Acid Red 51, 52, and 289, and Rhodamine B.

As used herein, the term "ammonium ion" refers to an ammonium ($NH_4^+$) whose hydrogens are optionally substituted by one or more $C_1$–$C_6$ alkyl substituents which may be substituted by one or more substituents comprising OH, $NH_2$, $CO_2M$, and $SO_3M$, wherein M comprises H, Na, K, and Li.

The dyes Rhodamine B, C.I. Acid Red 51, 52 and 289 may be purchased from various commercial suppliers including Aldrich Chemical Co. and Tricon Colors Inc. The metallized azo dye of Formula (I) may be prepared according to the procedure described below. The dyes of Formula (II), (IV) and (V) may be purchased from various commercial suppliers such as Ilford Imaging Switzerland GmbH. Specifically, the dye of Formula (II) may be purchased from Ilford as Magenta 377. The dyes of Formula (IV) and (V) may be purchased from Ilford as Yellow 1189 and Yellow 104, respectively. The dye of Formula (III) may be prepared according to the procedure described in U.S. Pat. No. 6,488,752. Further, the dye of Formula (V) may be prepared according to the procedure described in U.S. Pat. No. 5,844,100.

Humectants that may be employed in this invention are generally not limited and are known in the art. Illustrative examples include alkylene glycols, polyols, diols, bis-hydroxy terminated thioethers, and lactams.

The alkylene glycols useful as humectants generally have a molecular weight of from about 50 to about 4,000, preferably from about 50 to about 2,000, more preferably from about 50 to about 1,000, even more preferably from about 50 to about 500. Suitable polyalkylene glycols include polyethylene glycol, diethylene glycol, triethylene glycol, tetraethylene glycol, polyproylene glycol, dipropylene glycol, tripropylene glycol, and tetrapropylene glycol. In another embodiment, the humectant comprises tetraethylene glycol and tripropylene glycol.

Polyols useful as humectants generally contain at least 2 hydroxyl groups or alkyl ether derivatives thereof. Suitable triols include glycerol, trimethylol propane, trimethylol ethane, 1,2,4-butanetriol and 1,2,6-hexanetriol. Suitable tetrols include pentaerythritol, di-(trimethylol propane), and methyl glucosides, while glucose is a suitable pentol. Suitable hexols include sorbitol, dipentaerythritol and inositol.

Suitable bis-hydroxy terminated thioethers have the formula:

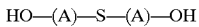

wherein each A is independently an aryl group or $(CR_2)_x$, and each R is independently a hydrogen, a $C_{1-6}$ alkyl group, aryl group or a halogen, and x is an integer from about 1 to about 7. Preferred bis-hydroxy terminated thioethers include 2,2'-thiodiethanol and bis-propanol thioether.

As used here, "lactams" is intended to include cyclic amide compounds such as cyclic amides, substituted cyclic amides and cyclic amide derivatives. Suitable lactams include pyrrolidone compounds, valerolactam compounds, caprolactam compounds, imidazolidinone compounds and oxazolidinone compounds. The cyclic amide compound may comprise 2-pyrrolidone, 1-methyl-2-pyrrolidone, 1,5-dimethyl-2-pyrrolidone, 1-ethyl-2-pyrrolidone 1-propyl-2-pyrrolidone, 1-isopropyl-2-pyrrolidone, 1-butyl-2-pyrrolidone, 1-(2-hydroxyethyl)-2-pyrrolidone, 1-methyl-2-piperidone, valerolactam, 1-ethyl valerolactam, caprolactam, 1-methylcaprolactam, oenantholactam, and mixtures thereof. Suitable imidazolidinone compounds include 1,3-dimethyl-2-imidazolidinone. A preferred lactam is 2-pyrrolidone.

The amount of humectant in the ink composition may range from about 0.1 to about 40% by weight. In an embodiment, the amount of humectant ranges from about 0.5 to about 30% by weight. In another embodiment, the amount of humectant ranges from about 1 to about 20% by weight.

Penetrants that may be employed in this invention are generally not limited and include hydroxy substituted hydrocarbons like 1,2-alkyl diols such as 1,2-pentanediol, 1,2-hexanediol and mixtures thereof. A more detailed description of such penetrants may be found in U.S. Pat. No. 5,364,461.

Additional examples of penetrants include: alkyl alcohols having 1 to 4 carbon atoms, such as ethanol, methanol, butanol, propanol and isopropanol; glycol ethers, such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-butyl ether, ethylene glycol-mono-t-butyl ether, diethylene glycol mono-t-butyl ether, 1-methyl-1-methoxy butanol, propylene glycol monomethyl ether, propylene glycol monoethyl ether, propylene glycol mono-t-butyl ether, propylene glycol mono-n-propyl ether, propylene glycol mono-iso-propyl ether, dipropylene glycol monomethyl ether, dipropylene glycol monoethyl ether, dipropylene glycol mono-n-propyl ether, and dipropylene glycol mono-iso-propyl ether; formamide; acetamide; dimethylsulfoxide; sorbitol; sorbitan; acetin; diacetin; triacetin; and sulfolane. A preferred penetrant is 1,2-hexanediol.

The amount of penetrant in the ink composition may range from about 0.01 to about 20% by weight. In an embodiment, the amount of penetrant ranges from 0.1 to 10% by weight. In another embodiment, the amount of penetrant ranges from about 0.5 to about 5% by weight.

The aqueous vehicle used in the ink compositions comprises water. The aqueous vehicle may further comprise a second solvent such as an organic solvent which is miscible with water. Selection of a suitable water miscible solvent depends on the requirements of the specific aqueous ink being formulated, such as the desired surface tension and viscosity, the colorant being used, the drying time required for the ink, and the type of paper onto which the ink will be printed. Representative examples of water soluble organic solvents that may be selected include (1) alcohols, such as methyl alcohol, ethyl alcohol, n-propyl alcohol, iso-propyl alcohol, n-butyl alcohol, sec-buty alcohol, t-butyl alcohol, iso-butyl alcohol, furfuryl alcohol, and tetrahydrofurfuryl alcohol; (2) ketones or keto alcohols, such as acetone, methyl ethyl ketone, and diacetone alcohol; (3) ethers, such as tetrahydrofuran and dioxane; (4) esters, such as ethyl acetate, ethyl lactate, ethylene carbonate and propylene carbonate; (5) polyhydric alcohols, such as ethylene glycol, diethylene glycol, glycerol, 2-methyl-2,4-pentanediol, 1,2,6-hexanetriol and thiodiglycol; (6) lower alkyl mono- or di-ethers derived from alkylene glycols, such as ethylene glycol monomethyl (or monoethyl) ether, diethylene glycol monomethyl (or monoethyl) ether, propylene glycol monomethyl (or monoethyl) ether, triethylene glycol monomethyl (or monoethyl) ether and diethylene glycol dimethyl (or diethyl) ether; (7) nitrogen-containing cyclic compounds, such as pyrrolidone, N-methyl-2-pyrrolidone, and 1,3-dimethyl-2-imidazolidinone; and (8) sulfur-containing compounds, such as dimethyl sulfoxide and tetramethylene sulfone. Other useful solvents include lactones and lactams.

When the aqueous vehicle comprises a miscible mixture of water and an organic solvent, the mixtures usually comprise greater than about 25% by weight water to about 99.9% by weight water based on total weight of the mixture. The preferred weight percent of water employed is about 50% to about 99.9% based on total weight of the mixture.

Other additives, such as biocides, viscosity modifiers, anti-kogation agents, anti-curling agents, chelating agents, anti-bleed agents, surfactants, and buffers may be added to the ink composition at their art established levels.

The biocides which may be employed are known and commercially available. They prevent growth of microorganisms in the ink. Examples of biocides that are suitable for use in this invention include those, for instance, which comprise benz-isothiazolin-one, methyl-isothiazolin-one and chloro-methyl-isothiazolin-one. A preferred biocide includes, but is not limited to, Proxel® GXL (available from Avecia).

Suitable chelating agents include, but are not limited to, sodium ethylene diamine tetraacetate, sodium nitrilotriacetate, sodium hydroxyethyl ethylene diamine triacetate and sodium diethylene triamine pentaacetate.

Suitable surfactants include, but are not limited to, nonionic, amphoteric and ionic surfactants. Preferred surfactants include, but are not limited to, alkyl sulfate, SILWET® (Union Carbide), TERGITOL® (Union Carbide) and SURFYNOL® (Air Products and Chemicals, Inc.).

The pH of the ink compositions of the present invention is typically between 5 and 9. In various embodiments, the pH of the magenta inks may be between 6 and 8. The appropriate pH for the ink composition can be obtained by adding either a base or an acid as necessary. Appropriate acids and bases are well known in the art. An appropriate base may include potassium hydroxide. An appropriate acid may include glycolic acid and acetic acid.

The ink composition of the present invention may be prepared by any method known in the art for making such compositions. When used in various ink jet printheads, the ink composition may have a viscosity of less than 10 cps, preferably less than 5 cps, at 25° C.

Application of the ink jet inks of this invention onto the print substrate can be made by any suitable printing process compatible with the aqueous-based inks, such as flexographic printing, pen plotters, continuous stream ink jet printing, drop-on-demand ink jet printing (including piezoelectric, acoustic, and thermal ink jet processes), or the like. The ink jet ink compositions of this invention are extremely useful in the thermal ink jet printing process. The print substrate employed can be any print substrate compatible with aqueous-based inks, including plain papers, such as commercial bond papers; coated papers (or special ink jet papers), such as those available from Hewlett Packard, Kodak, Ilford, Canon, and Xerox Corporation; textiles; special ink jet papers, including silica coated papers and photorealistic ink jet papers; photographic papers; and ink jet transparency materials suitable for aqueous inks or ink jet printing processes.

The following examples are detailed descriptions of methods of preparation and use of the inks and the ink system of the present invention. The detailed descriptions fall within the scope of, and serve to exemplify, the more general description set forth above. These examples are presented for illustrative purposes only, and not intended as a restriction on the scope of the invention.

EXAMPLES

Example 1

An ink formulation according to the present invention with the ingredients listed in Table 1 was prepared according to the following procedure.

TABLE 1

| Ingredient | % w/w |
|---|---|
| Dye of Formula (I) wherein $M^1$ is Copper | 1.17 |
| Dye of Formula (II) | 1.75 |
| Acid Red 52 | 0.5 |
| 2-Pyrrolidone | 8 |
| Tripropylene glycol | 6 |
| Tetraethylene glycol | 6 |
| 1,2-Hexanediol | 3 to 4 |
| Silwet ® | 0.5 to 1.0 |
| Water | balance |

The ink formulation was prepared by initially mixing deionized water, the dye of Formula (I) wherein $M^1$ is copper, the dye of Formula (II), and Acid Red 52 together for approximately 10 minutes. Tripropylene glycol, tetraethylene glycol, 1,2-hexanediol, and 2-pyrrolidone, and Silwet® were then added to the dye mixture and stirred for approximately 10 to 20 minutes. After a pH check to confirm that the ink was of the appropriate pH, the ink was filtered through a series of filters with the final filter being 0.22 microns.

Example 2

An ink formulation according to the present invention was prepared according to the procedure described in Example 1, except that the ingredients listed in Table 2 were used.

TABLE 2

| Ingredient | % w/w |
|---|---|
| Dye of Formula (I) wherein $M^1$ is Copper | 2 |
| Acid Red 52 | 1 |
| 2-Pyrrolidone | 8 |
| Tripropylene glycol | 6 |
| Tetraethylene glycol | 6 |
| 1,2-Hexanediol | 3 to 4 |
| Silwet ® | 0.5 to 1.0 |
| Water | Balance |

Example 3

An ink formulation according to the present invention was prepared according to the procedure described in Example 1, except that the ingredients listed in Table 3 were used.

TABLE 3

| Ingredient | % w/w |
|---|---|
| Dye of Formula (I) wherein $M^1$ is Copper | 2 |
| Acid Red 289 | 1 |
| Acid Red 52 | 0.1 |
| 2-Pyrrolidone | 8 |
| Tripropylene glycol | 6 |
| Tetraethylene glycol | 6 |
| 1,2-Hexanediol | 3 to 4 |
| Silwet ® | 0.5 to 1.0 |
| Water | Balance |

Example 4
Control Ink

A Control Ink formulation was prepared according to the procedure described in Example 1, except that the ingredients listed in Table 4 were used.

TABLE 4

| Ingredient | % w/w |
|---|---|
| Dye of Formula (I) wherein $M^1$ is Copper | 3 |
| 2-Pyrrolidone | 8 |
| Tripropylene glycol | 6 |
| Tetraethylene glycol | 6 |
| 1,2-Hexanediol | 3 to 4 |
| Silwet ® | 0.5 to 1.0 |
| Water | Balance |

Example 5

The ink formulations described in Examples 1–4 were tested for their chroma and lightfastness properties on three types of paper. In addition, the magenta ink formulation contained in the Lexmark® High Resolution Color Print Cartridge Model No. 83/18L0042 (available in the Lexmark® Z65 Jet printer) was tested as a comparison for its chroma and lightfastness properties.

The inks were tested on Kodak Premium Picture Paper (KPP) and Ilford Printasia Glossy Photo Paper (IPG). The inks were also tested on various plain papers (PP) for its chroma, and the data reported is an average of the results of these tests. Chroma (C*) was measured with a GretagMacbeth Spectrolino/Spectroscon T spectrophotometer on a printed sample with 100% ink coverage. Lightfastness was evaluated by subjecting a printed patch with optical density of 1.0 to 10 years of simulated fade under glass using a cool white fluorescent light source at 43 kLux. The value reported for lightfastness is the percent density loss.

| Ink Formulation | C* | | | Lightfastness | |
|---|---|---|---|---|---|
| | KPP | IPG | PP | KPP | IPG |
| Ex. 1 | 70.9 | 70.0 | 54.2 | 37% | 17% |
| Ex. 2 | 75.4 | 70.8 | 55.7 | 28% | 9% |
| Ex. 3 | 72.8 | 72.1 | 57.0 | 25% | 9% |
| Control Ink (Ex. 4) | 63.7 | 60.3 | 48.7 | 10% | 4% |
| Z65 Magenta | 77.2 | 76.0 | 61.4 | 46% | 28% |

The chroma and lightfastness tests demonstrate that inkjet inks described in Examples 1–3 possess a high level of chroma while achieving a desirable level of archivability. Further, the combination of magenta dyes in the inkjet inks herein can produce archivable images while maintaining excellent image quality.

Example 6

The metallized azo dye of Formula (I) may be prepared according to the following procedure. A slurry of 3-amino-4-hydroxybenzenesulfonic acid (79.48 g, 0.42 mol) and hydrochloric acid 37% aq. (104 g, 1.05 mol) in 250 mL deionized water was chilled to 0° C. in an ice bath. A solution of sodium nitrite (29 g, 0.42 mol) in 75 mL deionized water was added rapidly dropwise while maintaining the reaction temperature between 0 and 10° C. After complete addition, the ice bath was removed, and the mixture stirred at ambient temperature. The reaction was monitored periodically for the presence of excess nitrous acid using starch/KI paper. After 6 hours, excess nitrous acid was removed by reaction with sulfamic acid.

In a separate vessel, a slurry of 2-naphthol-3,6-disulfonic acid disodium salt (R-acid) (146.3 g, 0.42 mol) in 300 mL deionized water was cooled to 0° C. The 3-amino-4-hydroxybenzenesulfonic acid diazo solution prepared above was added while maintaining the temperature between 0 to 10° C. and while maintaining the pH>8 by the addition of ammonium hydroxide 29% aq. The mixture was stirred at ambient temperature for 16 hours, and then the product was precipitated by the addition of glacial acetic acid to pH 4.5. The solids were isolated and dried.

The dry dye (200 g, 0.4 mol) was redissolved in 2 L deionized water and triethanolamine (177.45 g, 1.2 mol) and was then added to a solution of copper(II) sulfate pentahydrate (108.9 g, 0.44 mol) and triethanolamine (325.32 g, 2.2 mol) in 1 L deionized water. The mixture was stirred for 3 hours at 40 to 50° C. to afford an aqueous triethanolamine salt of the dye of Formula (I).

In summary, numerous benefits have been described which result from employing the concepts of the invention. The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

We claim:

1. An inkjet ink comprising:
Acid Red 289 dye, and
a metallized azo dye comprising a dye having the Formula (I):

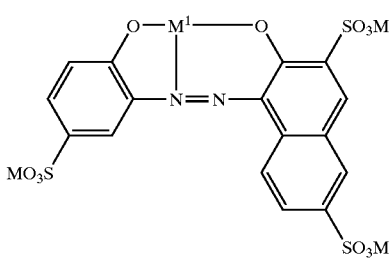

Formula (I)

wherein $M^1$ comprises Cu, Ni, Fe, or Cr, and M comprises —Na, —Li, —K, or an ammonium ion, and
wherein the weight ratio of Acid Red 289 to metalized azo dye is about 1:2.

2. The ink of claim 1, wherein $M^1$ comprises Cu.

3. A dye set for formulating inkjet inks comprising:
a magenta dye set comprising:
a xanthene dye, and
a metallized azo dye comprising a dye having the Formula (I):

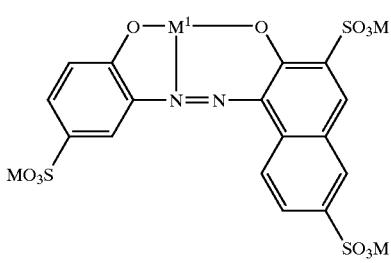

Formula (I)

wherein $M^1$ comprises Cu, Ni, Fe, or Cr, and M comprises —H, Na, —Li, —K, or an ammonium ion;
at least one yellow dye; comprising Acid Yellow 17 or Acid Yellow 23 in combination with Direct Yellow 132, a dye having the Formula (III) or tautomers thereof:

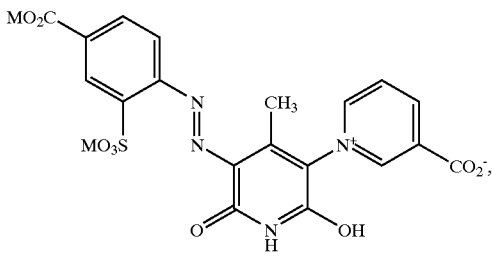

Formula (III)

a dye having the Formula (IV):

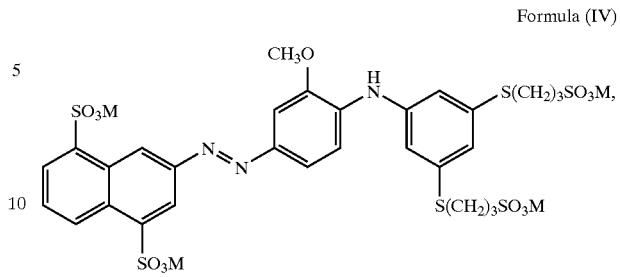

Formula (IV)

or a dye having the Formula (IV):

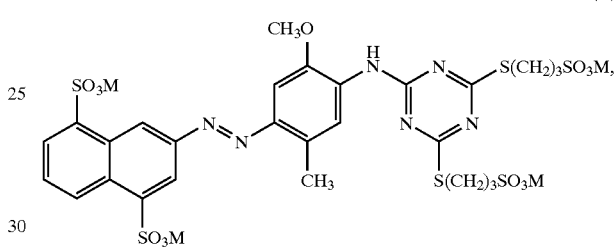

Formula (V)

wherein M comprises —H, —Na, —Li, —K, or an ammonium ion, and
at least one cyan dye.

4. The dye set of claim 3, wherein $M^1$ comprises Cu.

5. The dye set of claim 3, wherein the weight ratio of xanthene dye to metallized azo dye ranges from about 1:10 to about 1:1.

6. The dye set of claim 3, wherein the weight ratio of xanthene dye to metallized azo dye is about 1:2.

7. The dye set of claim 3, wherein the xanthene dye comprises at least one of Acid Red 52, Acid Red 289, or mixtures thereof.

8. The dye set of claim 7, wherein the amount of Acid Red 289 and the amount of Acid Red 52 is less than or equal to the amount of the metallized azo dye of Formula (I).

9. The dye set of claim 3, further comprising:
a triazine dye comprising a dye having the Formula (II):

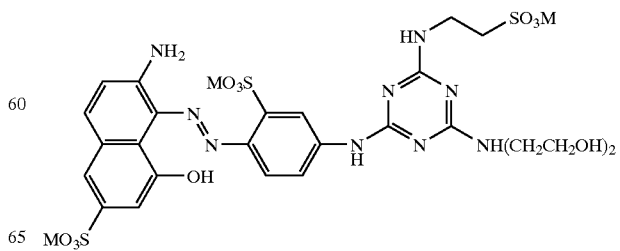

Formula (II)

wherein M comprises —H, —Na, —Li, —K, or an ammonium ion.

10. The dye set of claim 9, wherein the weight ratio of xanthene dye to metallized azo dye to triazine dye ranges from about 1:4:2 to about 1:2:4.

11. The dye set of claim 9, wherein the amount of xanthene dye is less than or equal to the amount of the metallized azo dye of Formula (I) and the amount of triazine dye.

12. The dye set of claim 3, wherein the at least one cyan dye comprises Direct Blue 1 99, Acid Blue 9, or mixtures thereof.

13. An inkjet ink set comprising:
a magenta ink comprising:
a xanthene dye, and
a metallized azo dye comprising a dye having the Formula (I):

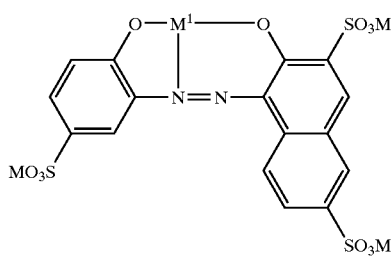

Formula (I)

wherein $M^1$ comprises Cu, Ni, Fe, or Cr; and M comprises —H, Na, —Li, —K, or an ammonium ion;

a yellow ink comprising at least one yellow dye comprising Acid Yellow 17 or Acid Yellow 23 in combination with Direct Yellow 132, a dye having the Formula (III) or tautomers thereof:

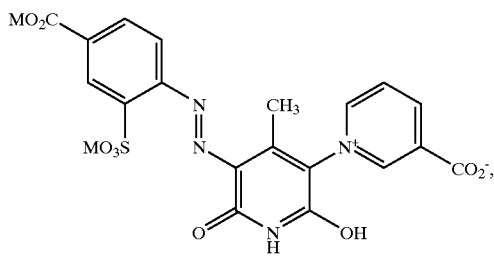

Formula (III)

a dye having the Formula (IV):

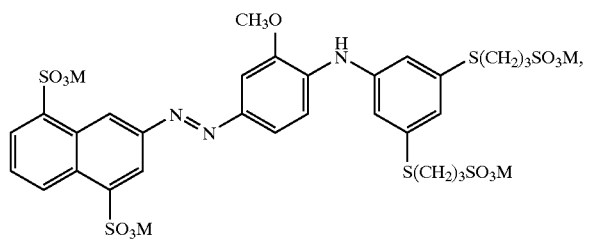

Formula (IV)

or a dye having the Formula (V):

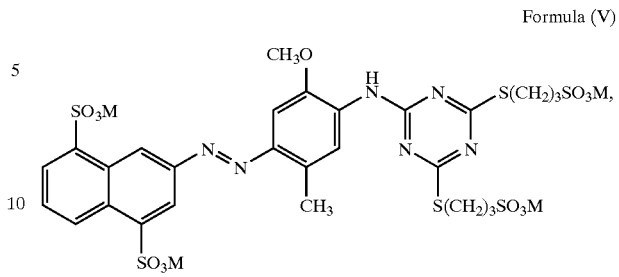

Formula (V)

wherein M comprises —H, —Na, —Li, —K, or an ammonium ion, and
a cyan ink comprising at least one cyan dye.

14. The ink set of claim 13, wherein $M^1$ comprises Cu.

15. The ink set of claim 13, wherein the weight ratio of xanthene dye to metallized azo dye ranges from about 1:10 to about 1:1.

16. The ink set of claim 13, wherein the weight ratio of xanthene dye to metallized azo dye is about 1:2.

17. The ink set of claim 13, wherein the xanthene dye comprises at least one of Acid Red 52, Acid Red 289, or mixtures thereof.

18. The ink set of claim 17, wherein the amount of Acid Red 289 is from about 0.0% to about 2% by weight, the amount of Acid Red 52 is from about 0.0% to about 1.5% by weight, and the amount of the metallized azo dye of Formula (I) is from about 2.0% to about 4.0% by weight.

19. The ink set of claim 18, wherein the amount of Acid Red 289 and the amount of Acid Red 52 is less than or equal to the amount of the metallized azo dye of Formula (I).

20. The ink set of claim 13, further comprising:
a triazine dye comprising a dye having the Formula (II):

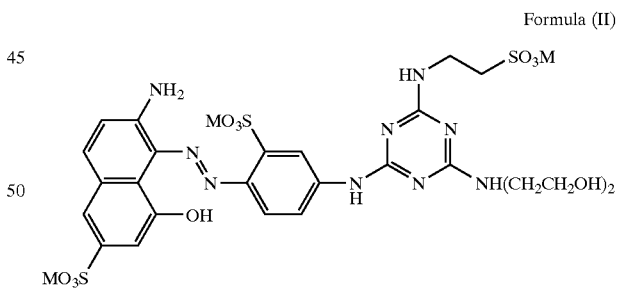

Formula (II)

wherein M comprises —H, —Na, —Li, —K, or an ammonium ion.

21. The ink set of claim 20, wherein the weight ratio of xanthene dye to metallized azo dye to triazine dye ranges from about 1:4:2 to about 1:2:4.

22. The ink set of claim 20, wherein the amount of xanthene dye is from about 0.5% to about 1.5% by weight, the amount of the metallized azo dye of Formula (I) is from about 1.0% to about 3.0% by weight, and the amount of triazine dye of Formula (II) is from about 1.0% to about 3.0% by weight.

23. The ink set of claim 21, wherein the amount of xanthene dye is less than or equal to the amount of the metallized azo dye of Formula (I) and the amount of triazine dye.

24. The ink set of claim 13, wherein the at least one cyan dye comprises Direct Blue 199, Acid Blue 9, or mixtures thereof.

25. A method for printing using an ink-jet printer, comprising printing from a set of ink-jet inks onto a printing medium, said ink set comprising:
a magenta ink comprising
Acid Red 289 dye, and
a metallized azo dye comprising a dye having the Formula (I):

Formula (I)

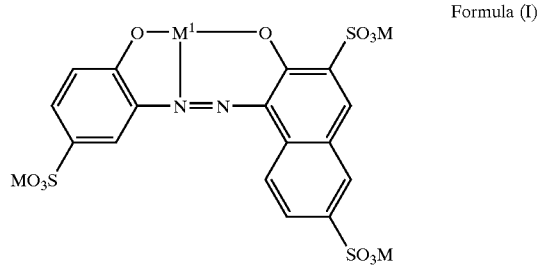

wherein $M^1$ comprises Cu, Ni, Fe, or Cr; and M comprises —Na, —Li, —K, or an ammonium ion;
a yellow ink comprising at least one yellow dye; and
a cyan ink comprising at least one cyan dye; and
wherein the weight ratio of Acid Red 289 dye to metalized dye is about 1:2.

26. The method of claim 25, wherein $M^1$ comprises Cu.

27. The method of claim 25, wherein the at least one yellow dye comprises Acid Yellow 17, Acid Yellow 23, Direct Yellow 132, a dye having the Formula (III) and tautomers thereof:

Formula (III)

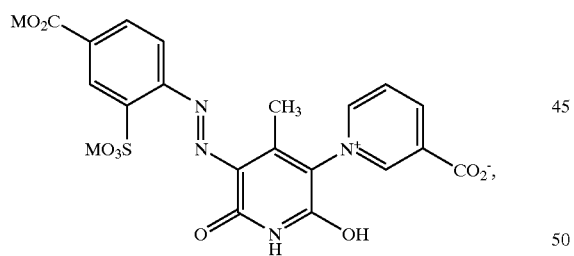

a dye having the Formula (IV):

Formula (IV)

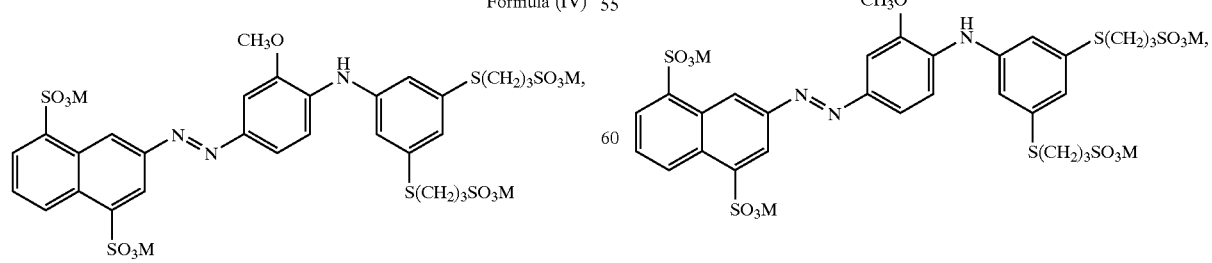

or a dye having the Formula (V):

Formula (V)

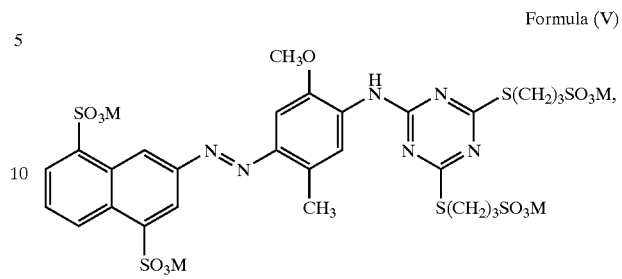

wherein M comprises —H, —Na, —Li, —K, or an ammonium ion.

28. The method of claim 25, wherein the at least one yellow dye comprises Acid Yellow 17 or Acid Yellow 23 in combination with Direct Yellow 132, a dye having the Formula (III) or tautomers thereof:

Formula (III)

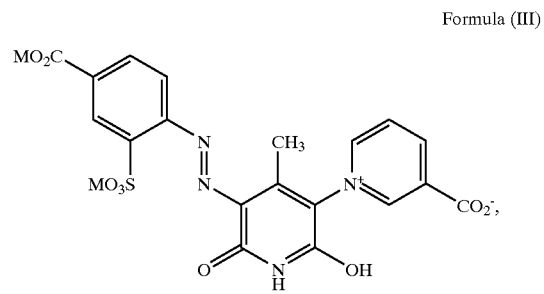

a dye having the Formula (IV):

Formula (IV)

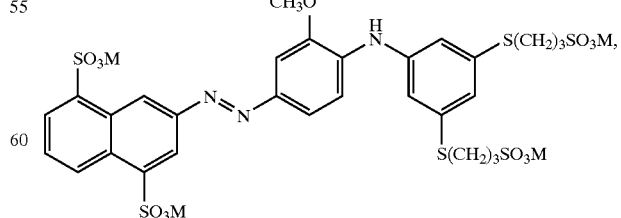

or a dye having the Formula (V):

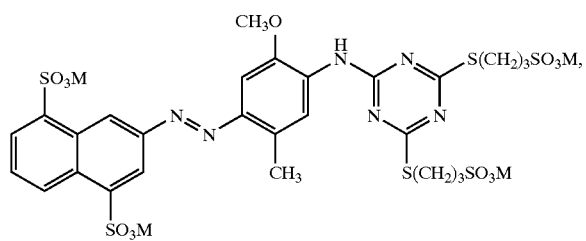

Formula (V)

wherein M comprises —H, —Na, —Li, —K, or an ammonium ion.

29. The method of claim 25, wherein the at least one cyan dye comprises Direct Blue 199, Acid Blue 9, or mixtures thereof.

30. A method for printing using an ink-jet printer, comprising printing from a set of ink-jet inks onto a printing medium, said ink set comprising:
  a magenta ink comprising
    a xanthene dye, and
    a metallized azo dye comprising a dye having the Formula (I):

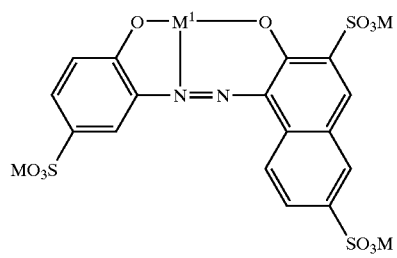

Formula (I)

wherein $M^1$ comprises Cu, Ni, Fe, or Cr; and M comprises —H, —Na, —Li, —K, or an ammonium ion;
a yellow ink comprising at least one yellow dye comprising Acid Yellow 17 or Acid Yellow 23 in combination with Direct Yellow 132, a dye having the Formula (III) or tautomers thereof:

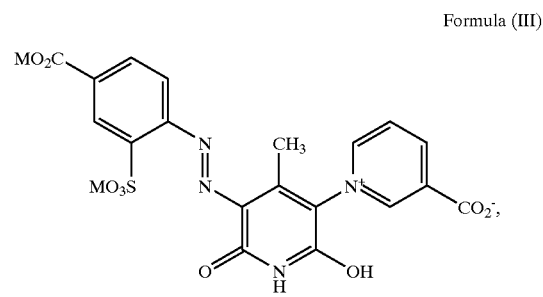

Formula (III)

a dye having the Formula (IV):

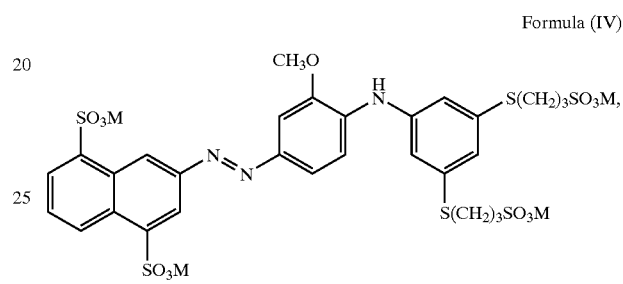

Formula (IV)

or
a dye having the Formula (V):

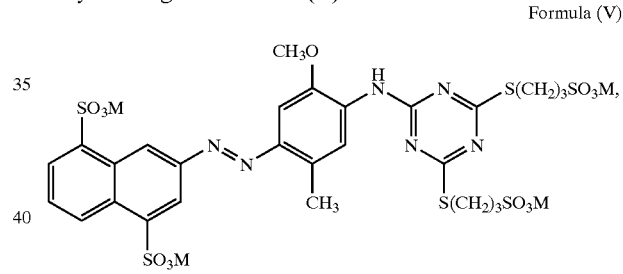

Formula (V)

wherein M comprises —H, —Na, —Li, —K, or an ammonium ion, and
a cyan ink comprising at least one cyan dye.

* * * * *